Figure 1:
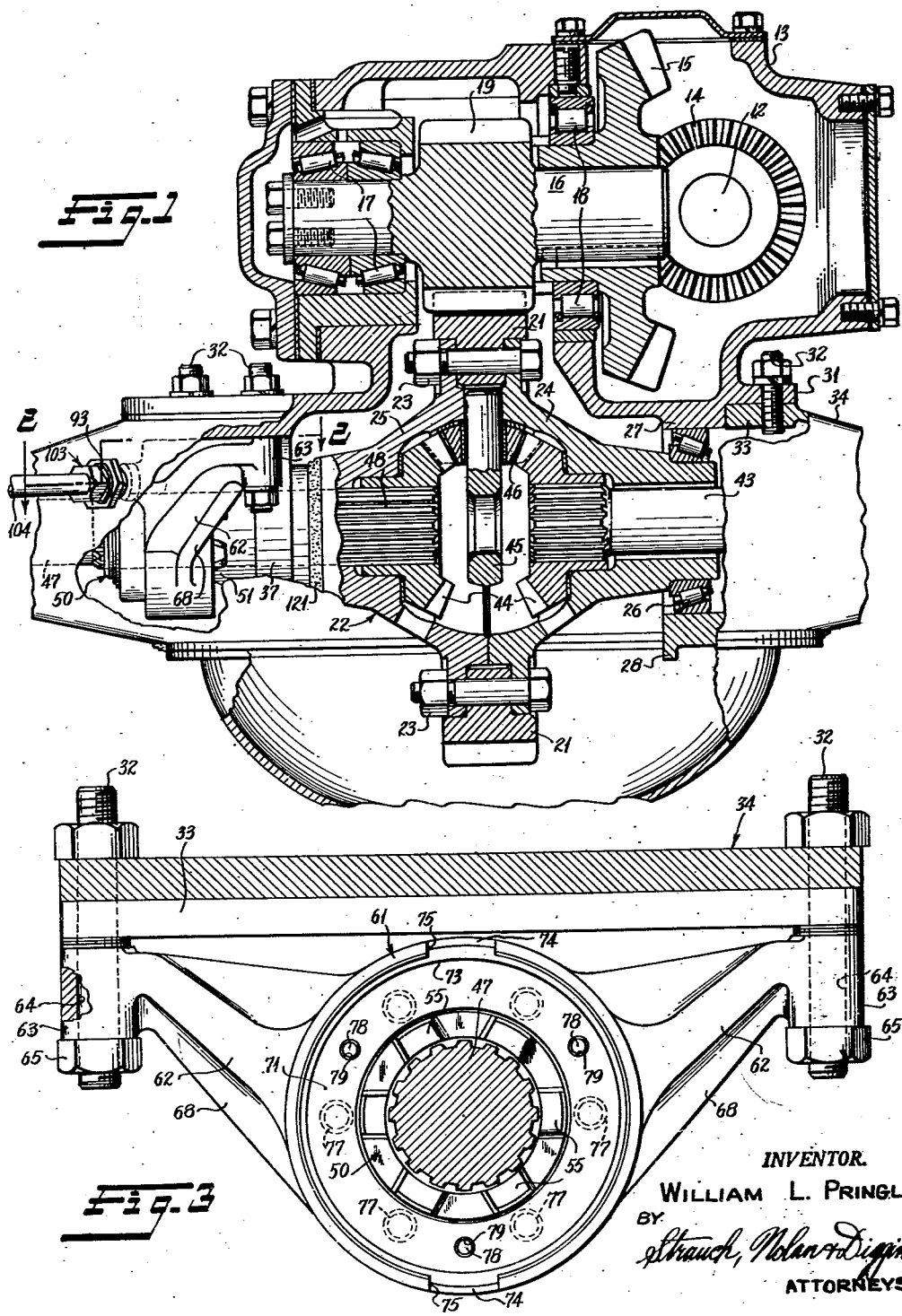

INVENTOR.
WILLIAM L. PRINGLE
BY
ATTORNEYS

2,803,149

SHIFT MECHANISM FOR LOCKING DIFFERENTIAL

William L. Pringle, Dearborn, Mich., assignor to Rockwell Spring and Axle Company, Coraopolis, Pa., a corporation of Pennsylvania Application June 11, 1954, Serial No. 436,117

4 Claims. (Cl. 74—710.5)

This invention relates to vehicle drive axles, and more particularly to shiftable locking mechanism for the axle differential and controls therefor.

Motor vehicles equipped with conventional differential axle drives have always been plagued with traction problems. When vehicles are driven on ice or over unusual terrain or through mud, torque transmitted through such conventional drive axle differentials is frequently dissipated by spinning wheels on one side of the drive axle while negligible torque is transmitted to the non-spinning wheels which in many instances may have sufficient traction to sustain reasonably efficient vehicle motion. When variable traction terrain conditions are encountered, a sudden increase in traction by a spinning wheel causes shock loading which may result in a broken axle shaft and/or severe damage to the differential, the vehicle transmission, or other elements in the power train.

Those familiar with this art know that selectively operable vehicle drive axle differential locking arrangements have been proposed and tried to avoid the foregoing difficulties. Much time and effort has been directed by major automotive concerns and the military services in attempting to develop suitable differential locking mechanisms. Although a few such locking mechanisms have been made to perform with a measure of success, there have been no simple practical differential locking mechanisms with sufficient advantages to be generally acceptable as providing the optimum solution of the problems involved.

All of these prior differential locking mechanisms which have been used to my knowledge provide for driver control, whereby positive locking mechanism is activated or inactivated only whenever the driver feels that the terrain demands it, and only when the vehicle is stopped and the power train disconnected. I have discovered that driver judgment is not particularly satisfactory because in many instances the driver locks out the differential when not necessary and in doing so subjects the axle shafts to undue strain. For example, under certain conditions the terrain may appear to the driver to require differential lockout whereas actually his momentum and surface conditions, not clearly determinable to him, may combine to provide traction for both wheels. This results in undue stress on the axle shafts and shortens their lives. Actually I have found that the differential need be locked out only for about two percent of the operational life of a heavy duty vehicle, but it will be appreciated that this two percent figure could increase depending upon the type of service in which the vehicle is used.

According to the present invention a special arrangement is provided for selectively presetting the differential lockout at any time regardless of whether the power train is connected or whether the vehicle is in motion. In practice I provide a fluid motor actuated clutch having special teeth adapted to automatically release under torque overload conditions, the on-off control for the motor being a manual valve accessible to the driver. Automatic release of the differential lockout mechanism when the axle shafts are subjected to predetermined high torques is preferably accomplished by the use of slope sided teeth on clutch members which are normally spring biased to released position and fluid powered into meshed position.

It is the major object of this invention to provide a reliable drive axle differential lockout mechanism and associated control thereof which is effective to lock out the differential substantially only when traction conditions require it.

A further object of the invention is to provide a novel fluid motor powered clutch mechanism for differential lockout in a vehicle drive axle.

A further object of the invention is to provide a novel vehicle drive axle differential lockout mechanism which can be activated or inactivated at any time during normal operation of the vehicle.

A further object of this invention is to provide for automatic release of the differential lockout mechanism in the event of predetermined axle shaft torque overload.

The flexibility of operation of this lockout mechanism makes it particularly adaptable for front drive axles to reduce undesirable steering effects ordinarily encountered with an unnecessarily locked differential and still retain maximum differential lockout control effectiveness. It is, therefore, another object of this invention to provide an improved differential lockout mechanism having minimum adverse steering effects.

A fluid line connector is used in passing the fluid motor supply conduit through the axle housing, which effectively seals the housing against loss of lubricating oil. A further major object of this invention, therefore, is to provide an improved fluid line connector which, although passing through the axle housing, effectively seals the housing against loss of lubricant. This connector per se may be of general application.

A further object of the invention is to provide a spring loaded valve control for the differential lockout with a dash mounted operating handle.

Another object is to provide this new improved lockout mechanism as either a conversion kit for existing vehicles or as an assembly for installation on new equipment.

A still further object of this invention is to provide a differential lockout assembly having complete interchangeability of all axle operating parts whether or not the axle is equipped with a differential lockout mechanism.

Figure 2:
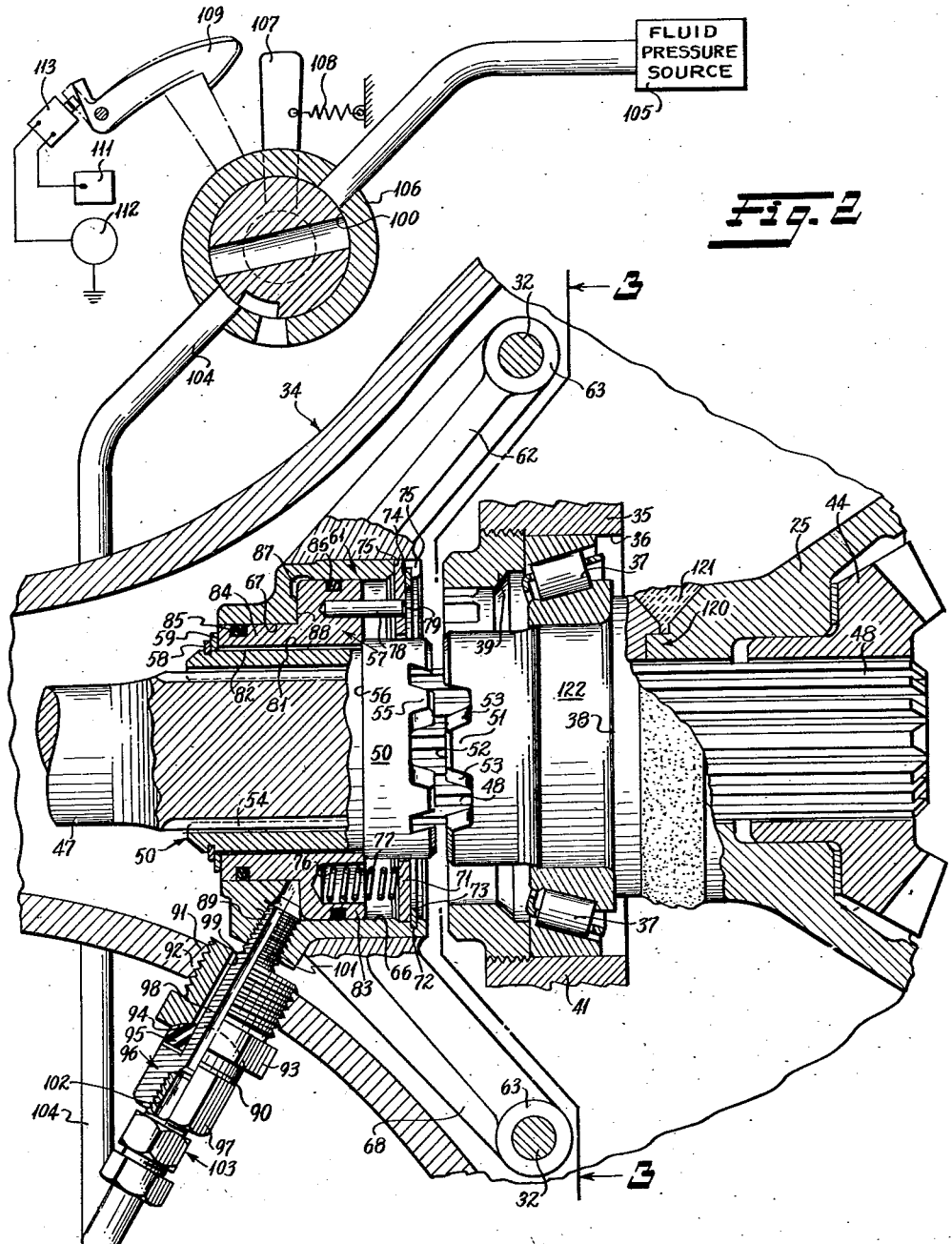

Further objects of the invention will become apparent as the invention proceeds in connection with the appended claims and the annexed drawings wherein:

Figure 1 is a rear elevation view partly broken away and in section of a vehicle drive axle differential equipped with an improved differential lockout according to a preferred embodiment of this invention;

Figure 2 is a fragmentary top view chiefly in section along line 2—2 in Figure 1 and in addition shows the external fluid power conduit for the clutch operating motor; and Figure 3 is an end view of the differential lockout clutch looking along the axis of the axle toward the wheel with the cutting plane of the section taken along lines 3—3 in Figure 2 which shows the mounting bracket, clutch collar and mating parts.

The differential lockout mechanism of this invention is illustrated as being used with an otherwise conventional single speed double reduction drive axle assembly. Input pinion shaft 12 is power driven from the usual vehicle power plant and drive train and extends into housing carrier 13 where bevel pinion 14 thereon is in constant mesh with a bevel pinion 15 on cross shaft 16.

Roller bearing units 17 and 18 support cross shaft 16 and an integral helical gear 19 which is in constant mesh with helical gear 21 fastened to the differential cage 22 by bolt assemblies 23 which secure the differential cage members 24 and 25 together. The differential cage is mounted in a conventional manner on the right side of Figure 1 by roller thrust bearing assembly 26 in one integral arm 27 of carrier 13, being removably secured therein by an annular nut (not shown), and bearing cap 28. Carrier 13 is provided with a continuous flange 31 through which extend studs 32 to removably mount the carrier upon a coacting flange 33 of axle housing 34, flange 33 surrounding the usual opening in the axle housing so that when the stud nuts at 32 are tightened the differential is located within the center section of axle housing 34. A circumferential series of these studs 32 are arranged about the flange 33.

Referring now to Figure 2 the other usual integral carrier arm 35 is illustrated somewhat out of position. It has a bore 36 in which is mounted the outer race of a roller thrust bearing unit 37 whose inner race is press fitted upon the outer end portion of cage half 25 and abuts a radial shoulder 38 on cage half 25. An annular nut 39 threaded in the carrier arm 35 and coacting bearing cap 41 engages the outer race of the bearing and provides the bearing adjustment.

A conventional axle shaft 43 extends through cage half 24 into splined engagement with one side gear 44 of the differential. The other side gear 44 is mounted conventionally within the cage and a spider 45 carries the usual pinion gears 46 meshed with both side gears.

The other axle shaft 47 is different from axle shaft 43 by reason of a longer splined section 48 that is conventionally mounted at its inner end within the splined hub of left side gear 44 of Figure 1. The purpose of this long splined section 48 will later be described.

Cage half 25 differs from cage half 24 essentially in that the former terminates beyond bearing 37 in an axially directed row of clutch teeth 51 which have flat end faces 52 perpendicular to the axis of shaft 47 and sloping side faces 53 for a purpose to appear.

A differential lockout clutch collar 50 is non-rotatably but axially slidably mounted on the splined axle shaft section 48 by internal splines 54 and its inner end is provided with flat end sloping side teeth 55 cut to mate with the cage teeth 51. The collar 50 is provided with a radial shoulder 56 abutted by an annular thrust piston 57 for a shift to clutching engagement of teeth 55 and 51. At the end opposite teeth 55 a collar snap ring 58 fits in a groove of collar 50 and receives axial thrust from piston 57 through thrust washer 59 to disengage teeth 55 from teeth 51 when piston 57 is not actuated by fluid pressure as will appear.

Referring also to Figures 2 and 3 piston 57 is reciprocable within a support cylinder 61 integrally formed with two mounting arms 62 which extend laterally from each side of the cylinder and upwardly and inwardly to terminate in bosses 63 having bores 64 through which pass two of the studs 32 which are for this reason longer than the other studs. When nuts 65 are tightened the cylinder 61 is fixed to the axle housing with cylindrical bores 66 and 67 coaxial with shaft 47. Reenforcing webs 68 are provided for arms 62.

Annular spring backing plate 71 freely surrounds the inner end of clutch collar 50 and is retained against outward axial shift in bore 66 by snap ring 72 fitting in groove 73. Plate 71 is fixed against rotation by two tongues 74 which radially project into slots 75 in cylinder 61 as shown in Figure 3. Figure 2 illustrates in section one such tongue 74 in a slot rotated 90° out of position.

Recesses 76 provided in piston 57 receive and guide a series of coil springs 77 compressed between the piston 57 and plate 71, to resiliently bias piston 57 and clutch collar 50 toward the clutch disengaged position of Figure 2. Guide pins 78 are fixed in piston 57, and freely slidably pass through apertures 79 in spring backing plate 71 to prevent rotation of the piston 57 within the cylinder.

Annular piston 57 which is thereby non-rotatably mounted in cylinder 61 has an inner cylindrical bore 81 in surrounding spaced relationship to the cylindrical surface 82 of collar 50 which rotates with axle shaft 47. The enlarged portion 83 of piston 57 has a sliding fit in cylinder bore 66, and the reduced portion 84 of the piston 57 has a sliding fit in bore 67. Seal rings 85 and 86 which are preferably of the uniform cross section rubber O-ring type are provided in suitable surface grooves in the piston portions to coact with bores 66 and 67 to prevent the escape of fluid from, and the ingress of oil into, an annular chamber 87 which is recessed into the corner provided by the intersection of bore 66 with radial flat wall 88 which serves as a stop to limit outward displacement of piston 57.

Annular cylinder chamber 87 communicates with a threaded bore 89 in the wall of cylinder 61. Adjacently the axle housing is formed with a threaded bore 91 in which is mounted an annular plug 92 having a hexagonal head 93. The hexagonal head 93 at the outer end of plug 92 is provided with a spherical sealing seat 94 for a resilient seal 95 which may be moulded rubber. An inner connector 96 has a hexagonal head 97 and a tubular shank 98 which projects with ample clearance through opening 99 of plug 92 and is threaded at end 101 to fit into bore 89. Threaded opening 102 of connector 96 receives a conventional terminal fitting assembly 103 on the end of a conduit 104.

Connector 96 is tightened with threaded end 101 in the threaded bore 89 of the cylinder 61, causing washer 90 to compress resilient seal 95 into spherical seat 94. The ample clearance provided between tubular connector shank 98 and plug bore 99 and spherical seat 94 is to allow for any misalignment. Rubber seal 95 prevents loss of oil from the axle housing and cushions any vibration or relative motion between cylinder 61 and the axle housing transmitted to inner connector 96. In some axle embodiments plug 92 may be eliminated, and an opening comparable to opening 99 and a spherical seat similar to seat 94 may both be directly provided in housing 34.

The fluid line 104 is connected to any available source of air pressure such as the conventional air brake supply tank 105 through a valve 106. Valve 106 is conveniently mounted at a point readily accessible to the driver so that when manual handle 107 is turned counterclockwise in Figure 2, valve passage 100 in the rotatable valve element will align with conduit 104 and air pressure will be supplied to the differential lockout unit cylinder to force clutch teeth 55 into mesh with teeth 51. Handle 107 is preferably biased by a spring 108 so that when it is released it automatically returns to off position and immediately permits separation of the clutch teeth in the differential lock-out mechanism. By this control arrangement the differential lock-out is introduced only when the driver desires it.

A pivoted latch 109 is provided to hold handle 107 in valve open position so that the differential lock-out will be activated so long as handle 107 is held in this position. To eliminate driving inadvertently with the differential lock-out activated, a buzzer 111 or signal lamp 112 may be energizedw through latch controlled switch 113 as a reminder that the differential lock-out controls are in the "on" position. To unlatch handle 107 the operator manually lifts latch 109 thereby allowing handle 107 to spring back to "off" position. It is desirable that the lockout be deactivated when not needed even though it may be left in the activated locked state when operating on the highway without fear of trouble.

Referring to Figure 2, the illustrated end of cage half 25 is composed of a conventional differential cage half cut off at region 120 to interfit with and be welded as at 121 to a special end portion 122 bearing the clutch teeth 55. This represents a standard cage half modified for purposes of the invention. However, it will be appreciated that equivalently the end portion 122 could be integral with the remainder of cage half 25.

In normal operation with the controls and parts in the "off" position of Figure 2 the axle shafts are differentially driven as in the usual axle. When the need for differential lock-out arises, or appears to arise, the operator moves handle 107 to the "on" position held by latch 109 to open valve 106 permitting air pressure to be applied through conduit 104 to cylinder chamber 87. This causes piston 57 to engage shoulder 56 on clutch collar 50 thus causing clutch collar 50 to slide to the right in Figure 2 and force clutch teeth 55 into engagement with mating teeth 51. Teeth 51 are rigidly connected to the rotating casing of the differential. Since clutch collar 50 is splined to axle shaft 47, the engagement of teeth 55 with teeth 51 locks differential side gear 44 with respect to the differential cage thus eliminating any differential action, and the rotating collar 50 is axially restrained relative to piston 57 by washer 59 and shoulder 56.

Annular spring backing plate 71 is fixed to cylinder 61. Therefore when the clutch teeth are engaged springs 77 are compressed. When the valve 106 is returned to the Figure 2 position the force stored in springs 77 disengages the clutch teeth.

An important feature of the invention is that the differential lockout clutch will be disengaged whenever the axle shaft torque loading exceeds a predetermined value. The automatic disengaging feature is due to the use of the sloping side surface clutch teeth. A component of the axle driving torque is caused by these sloping surfaces to be transformed to a force directed parallel to the axle axis tending to separate the clutch parts 25 and 50. If side faces 53 were perpendicular to surface 52, no force tending to separate the clutch parts would be present. The force tending to hold the engaged clutch parts together is the force due to the product of the piston area and the line pressure less the force due to the compressed springs.

When the clutch teeth are meshed and torque is being transmitted through the axle shaft to the associated wheel, the clutch parts are held together due to the force of the air motor and friction due to that torque. Should the wheel encounter a dry spot which would suddenly increase its traction to a point where the drive torque exceeded a predetermined value, the developed axial force component due to the slanting face clutch teeth would overcome that engaging force and the friction and force the clutch parts apart to disengage them. Should that condition suddenly disappear the clutch will be automatically engaged at once.

In one specific embodiment given by way of example using gear teeth having a 9½° angle of slope for side faces 53 and approximately 400 pounds exerted by piston 57, the lockout mechanism automatically disengaged when the drive axle shafts were subjected to a torque difference less than the torsional breaking point of any of the drive axle or differential parts.

This type of lockout mechanism is especially useful for front wheel drives in vehicles because the fluid pressure, the area of the piston and slope of the teeth can all be chosen so that the clutch will automatically disengage when a predetermined axle shaft torque difference, for example, 75% of the torque that is required to slip the tires of one axle shaft under normal static loads when the tires of the other axle shaft are freely slipping is present. This greatly reduces the undesirable steering effects normally present when the front differential is locked out and still gives the advantages of a locked-out differential insofar as traction is concerned. Even though shock loading may result when the teeth repeatedly come together during automatic disengagement caused by a torque overload on the axle, the use of sloped teeth prevents this loading from exceeding a predetermined safe value.

There is provided by my invention a new improved fluid shift clutching differential lockout contained within an axle housing and selectively operable at any time during the operation of the vehicle. The selective control by the vehicle driver of the lockout mechanism permits the differential to be locked out only when necessary and therefore prevents unnecessary axle loading and consequently increases axle shaft fatigue life and differential wear life. This invention further provides a differential lockout mechanism which may be supplied as a conversion kit consisting of a special toothed end differential cage half like 25 and the piston and clutch half assembly mounted on cylinder 61 and arms 62, together with the necessary conduit and conduit connections shown in Figure 2, or installed as original equipment in drive axles, and, when used with front drive axles greatly reduces the undesirable steering effects. It further provides a lockout clutch release automatically operable at a predetermined safe percentage of axle shaft torque capacity and the necessary components comprise a light compact assembly which can be incorporated in a conventional axle housing.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore intended to be embraced therein.

What is claimed and desired to be secured by United States Letters Patent is:

1. In combination with a vehicle drive axle assembly including a housing provided with a central differential receiving portion, a differential carrier having spaced arms providing bearing seats and extending within said axle housing and a peripheral attachment flange secured to an abutting face of said axle housing, a differential mechanism journalled on said carrier within said axle housing differential receiving portion by spaced bearings mounted in the bearing seats of said arms, a pair of oppositely extending axle shafts mounted respectively in the oppositely extending portions of said axle housing projecting from the differential receiving portion and drive connected at their adjacent ends to the side gears of said differential mechanism, a first toothed clutch component fixed to one end of the cage of said differential mechanism exteriorly of one of the bearings journalling said differential mechanism in surrounding relation to one of said axle shafts, an assembly adapted to coact with said clutch component to provide a torque overload release lockout for said differential mechanism and comprising a mounting bracket having a central portion of generally annular configuration surrounding said one axle shaft and oppositely extending arms secured to said axle housing at the mounts for said differential carrier, a second toothed clutch component complementary to said first clutch component and splined to said one axle shaft within the annular portion of said bracket, and capable of axial movement along said axle shaft, an annular fluid motor surrounding the second said clutch component within said bracket annular portion and operatively connected thereto to shift said second clutch component to couple said differential cage and said one axle shaft for concomitant rotation, said complementary clutch components having the axially extending teeth of trapezoidal cross section in said axial direction to provide opposed inclined faces of such relative inclination that an increase in torque transmitted between said clutch components produces concomitant increase in axial separating force between said clutch components and means selectively actuated to connect said fluid motor to a source of fluid pressure whereby upon development of a predetermined torque between said differential cage and said one axle shaft, said second clutch component will be shifted to its disengaged position in opposition to the fluid pressure bias exerted thereon by said fluid motor.

2. The combination defined in claim 1 wherein said means for selectively energizing said fluid motor includes a source of fluid pressure and the fluid pressure transmitting conduit extending from said source through said axle housing to said fluid motor.

3. In combination with a vehicle drive axle assembly including a housing provided with a central differential receiving portion, a differential carrier having spaced arms extending within said axle housing, means securing said carrier to said axle housing, a differential cage journalled on said carrier within said axle housing differential receiving portion by spaced bearings mounted in said arms, differential mechanism within said cage including spaced side gears, a pair of oppositely extending axle shafts mounted respectively in the oppositely extending portions of said axle housing projecting from the differential receiving portion and drive connected at their adjacent ends to said side gears, a first toothed clutch component fixed to one end of said differential cage exteriorly of one of said bearings in surrounding relation to one of said axle shafts, means adapted to coact with said first clutch component to provide a torque overload release lockout for said differential mechanism and comprising a mounting bracket surrounding said one axle shaft and having oppositely extending arms secured to said axle housing, a second toothed clutch component complementary to said first clutch component and slidably splined to said one axle shaft so as to be capable of axial movement along said axle shaft, an annular fluid pressure responsive motor carried by said bracket coaxial with the second said clutch component operatively connected to selectively shift said second clutch component to engage said first clutch component to couple said differential cage and said one axle shaft for concomitant rotation, said complementary clutch components having the axially extending teeth of substantially trapezoidal cross section in said axial direction to provide opposed inclined faces of such relative inclination that an increase in torque transmitted between the engaged clutch components produces concomitant increase in axial separating force between said clutch components and upon development of a predetermined torque between said differential cage and said one axle shaft said second clutch component will be shifted to its disengaged position, and means selectively actuated to connect said motor to a source of fluid pressure outside the axle housing.

4. In a vehicle drive axle assembly, a housing, a differential cage mounted within said housing for rotation about an axis, an axle shaft projecting from one side of said cage, a clutch collar non-rotatably and slidably mounted on said shaft adjacent said cage, coacting clutch teeth on the collar and cage, and a fluid pressure responsive motor for actuating said clutch collar comprising a support mounted within said housing having a cylinder concentric with said shaft, a reciprocable piston in said cylinder, means operably connecting said piston and collar so that reciprocation of said piston correspondingly slides said collar, said means providing relative rotation between the collar and piston, means for introducing fluid under pressure through the axle housing into said cylinder, and resilient piston return means normally urging said piston and collar to disengage said clutch teeth, said resilient means being energized when said piston is advanced under fluid pressure to engage said clutch teeth.

References Cited in the file of this patent
UNITED STATES PATENTS

| 1,355,297 | Woodward | Oct. 12, 1920 |
| 1,464,795 | Woodward | Aug. 14, 1923 |
| 1,488,581 | Woodward | Apr. 1, 1924 |
| 1,494,457 | Woodward | May 20, 1924 |
| 1,515,916 | Woodward | Nov. 18, 1924 |
| 2,057,744 | Sanford | Oct. 20, 1936 |
| 2,137,249 | Sanford | Nov. 22, 1938 |
| 2,580,381 | Banker | Jan. 1, 1952 |
| 2,620,055 | Fasulo | Dec. 2, 1952 |

FOREIGN PATENTS

| 56,771 | France | July 30, 1952 |